United States Patent [19]

Wolf

[11] Patent Number: 4,525,849
[45] Date of Patent: Jun. 25, 1985

[54] DATA TRANSMISSION FACILITY BETWEEN TWO ASYNCHRONOUSLY CONTROLLED DATA PROCESSING SYSTEMS WITH A BUFFER MEMORY

[75] Inventor: Gerhard Wolf, Munich, Fed. Rep. of Germany

[73] Assignee: Siemens Aktiengesellschaft, Berlin and Munich, Fed. Rep. of Germany

[21] Appl. No.: 477,980

[22] Filed: Mar. 23, 1983

[30] Foreign Application Priority Data

Apr. 8, 1982 [DE] Fed. Rep. of Germany ....... 3213345

[51] Int. Cl.³ .............................................. H04L 7/00
[52] U.S. Cl. .................................... 375/118; 328/55; 365/221; 377/78
[58] Field of Search ................... 307/269, 527; 328/55, 328/63, 72, 73, 75; 365/221, 233; 370/108; 375/118, 119; 377/66, 78

[56] References Cited

U.S. PATENT DOCUMENTS

| | | | |
|---|---|---|---|
| 3,893,033 | 7/1975 | Finch | 328/72 |
| 4,070,630 | 1/1978 | Hepworth et al. | 328/63 |
| 4,392,234 | 7/1983 | Maruta | 370/108 |
| 4,429,386 | 1/1984 | Graden | 375/118 |
| 4,433,394 | 2/1984 | Torij et al. | 377/78 |
| 4,443,765 | 4/1984 | Findeisen et al. | 328/55 |

OTHER PUBLICATIONS

"The Incorrect Operation of Asynchronously Driven Flip-Flops", by Von Gerhard Wolf, Frequenz 31 (1977) 3, pp. 71–76.
"Asynchronous Control of Data Transfer", by Jenkins and Recupere, IBM Technical Disclosure Bulletin, vol. 10, No. 1, Jun. 1967, pp. 34–36.

Primary Examiner—Benedict V. Safourek
Attorney, Agent, or Firm—Hill, Van Santen, Steadman & Simpson

[57] ABSTRACT

In order to avoid unambiguous logic switching statuses in a data and control path upon transfer from one clock system of an outputting data processing system into an independent, asynchronous clock system of an accepting data processing system, and wherein a continuous data flow is to be guaranteed at the output of a buffer memory, a control signal indicating the presence of an intermediately stored data word is synchronized into a forwarding timing pattern of the accepting system via a synchronization circuit for forwarding data words from the buffer memory. A forwarding sync control signal is generated by the synchronization circuit. For controlling the in-flow into the buffer memory, a control signal dependent on the forwarding timing pattern of the accepting system is synchronized into the timing pattern of the outputting system over a further synchronization circuit. A request sync control signal is generated which respectively leads to the transfer of a data word together with a strobe signal to the buffer memory which undertakes the intermediate storage on the basis of the strobe signal. In order to guarantee a continuous data flow at the output of the buffer memory, the buffer memory has at least three, and preferably four memory sections.

21 Claims, 18 Drawing Figures

DATA TRANSMISSION FACILITY BETWEEN TWO ASYNCHRONOUSLY CONTROLLED DATA PROCESSING SYSTEMS WITH A BUFFER MEMORY

BACKGROUND OF THE INVENTION

The invention relates to a data transmission facility between two asynchronously controlled data processing systems. The facility has a buffer memory constructed of a plurality of memory sections for the intermediate storage of a respective data word, and also two control devices. One control device is an input control and controls the transfer of one respective data word into a memory section of the buffer memory available for the transfer synchronously with a system clock of the system emitting the data. The other control device is an output control and controls the forwarding of one respective data word from the memory section of the buffer memory available for output to the system accepting the data, and controls the forwarding synchronously with the system clock of the system accepting the data.

Corresponding data transmission facilities are known, for example, from the IBM Technical Disclosure Bulletin, Vol. 10, No. 1, June 1967, pages 34–36, incorporated herein by reference. With this known arrangement, there is the disadvantage that data words, under certain conditions, can be lost during the transmission between the two asynchronously functioning systems when a release or turnoff of the buffer memory overlaps with an input or, on the other hand, when a call-signal overlaps with a load in the buffer memory such that the corresponding circuit elements are situated in a status in the time span critical for the transmission which is not unambiguously logically defined or metastable, as is explained, for example, in "Frequenz" 31 (1977) 3, Pages 71 through 76, incorporated herein by reference.

The arrangement known from U.S. Pat. No. 4,070,630, incorporated herein by reference, does not function satisfactorily in this regard even though the call-in by the free buffer memory is correlated with the trailing edge of the individual clock pulses of the system clock of the outputting data process system.

SUMMARY OF THE INVENTION

It is therefore an object of the invention to create a data transmission facility of the type initially cited which functions in faultless fashion independently of the frequency ratio of the two clock systems, and which nonetheless assures as continuous as possible a data flow at the output of the buffer memory given a respectively minimum outlay for memory space in the buffer memory, particularly when the clock frequency of the accepting system is lower than that of the outputting system.

This object is achieved by means of providing at least three memory section means in the buffer memory. After acceptance of a data word in the buffer memory the buffer memory creates a corresponding second control signal which is synchronized via the second synchronization circuit means into a timing pattern of the system clock of the accepting system while avoiding logically undefined intermediate statuses in the data and control paths. The second synchronization circuit means creates therefrom a second synchronization control signal which initiates the forwarding of a data word. The first synchronization circuit means at the input side receives a first control signal dependent on a forwarding timing pattern of the accepting system clock. The first synchronization circuit means synchronizes the first control signal into a timing pattern of the outputting system clock and creates a first synchronization control signal for initiating transfer of the data word together with a strobe signal from the data outputting system. Logically undefined intermediate statuses in the data and control path are thereby avoided.

According to the above features at least three memory sections in the buffer memory are required. One is required for readying the data word to be forwarded for the duration of a clock period. One is needed for bridging the synchronization time before the forwarding as long as the necessary synchronization time is at most equal to the clock period duration of the accepting system. Finally, one is required for bridging the lock-in time of a memory request existing in the outputting system clock timing pattern into the clock timing pattern of the accepting system. Moreover, it is not only the control signals initiating the forwarding which are synchronized into the timing pattern of the accepting system, but, rather, the control signals derived from the forwarding timing pattern are synchronized into the timing pattern of the outputting system and, thus, metastable statuses are impossible in the overall data and control path. Since further the control signals to be synchronized into the timing pattern of the outputting system are always correlated with a possible forwarding pulse, that point in time beginning when a memory section is available for the acceptance of a new data word is always fixed so that it is always only one data word which is transferred into the buffer memory in the steady state condition when an intermediately stored data word is previously forwarded. In other words, the in-flow ensues given a higher clock frequency of the outputting system controlled with an intermittent clock in the timing pattern of the outputting system given automatic matching to the maximum data rate conditioned by the accepting system without a separate request/acknowledgement system being required for that purpose. The time differences thereby deriving are fully intercepted by the memory sections provided in the buffer memory.

Proceeding from this basic principle, further features relate: to the derivation of the control signals to be synchronized into the timing pattern of the outputting system, namely directly from the clock pulses of the accepting system or from a control signal dependent thereon indicating the free condition of at least one memory section in the buffer memory as well as from a combination of both alternative solutions; to the treatment of said control signals and the design of the synchronizing circuits at both ends of the buffer memory, particularly when requests for transfer into the buffer follow too quickly on one another as a result of the necessary synchronizing times and also to the necessary increase of the number of memory sections in the buffer memory depending on various marginal situations; to the design of the buffer memory as a normal memory having mutually independent write and read controls or as an asynchronously functioning tailing or following memory having a following synchronization stage, and also to the possible partial integration of the synchronizing circuits in the control of the buffer memory; and to the employment of the data transmission facility together with a computer as a system emitting data in conjunction with a further buffer memory and/or together with a transmission system having a divergent timing pattern coupling two computers to one another.

DESCRIPTION OF THE PREFERRED EMBODIMENTS

Figure 1:
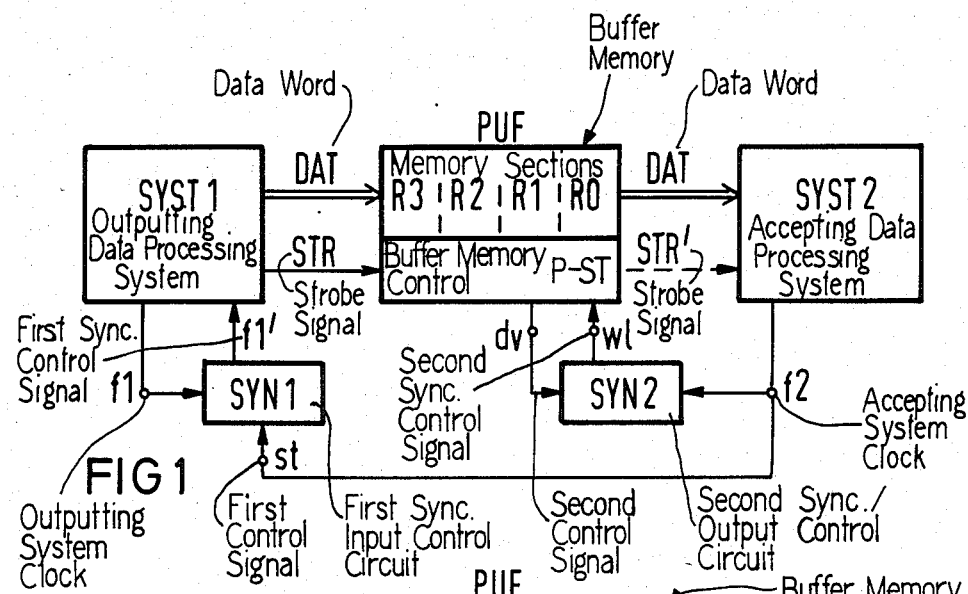
FIG. 1 is a block diagram of a preferred embodiment according to the invention.

FIG. 1 provides an overview of the data transmission facility comprised of a buffer memory PUF with four individual registers R2 through R0. A buffer memory control P-ST is also provided for writing the data words DAT transmitted by the outputting data processing system SYST1 into the individual registers R3 through R0, depending on accompanying strobe signals STR, and for reading out and forwarding the intermediately stored data words DAT to the accepting data processing system SYST2. Two required synchronizaion circuits first sync input control circuit SYN1 at the input side, and second sync output control circuit SYN2 at the output side of the buffer memory PUF are also shown.

The two data processing systems SYST1 and SYST2 function asynchronously relative to one another with different system clocks f1 and f2, and can represent arbitrarily functioning systems, for example an independently functioning data store with rigid write and read cycles, or a computer, or a transmission system having a transmission channel coupled by the transmission and reception devices.

Both first and second synchronization circuits SYN1 and SYN2 function in such manner that a supplied first control signal st or second control signal dv is integrated or locked into the respective system clock f1 timing pattern or system clock f2 timing pattern, and delayed by a time duration excluding metastable statuses. They become effective as a first or second synchronous control signal f1' or w1 in the respective system clock timing pattern and initiate the data transfer or forwarding.

In the embodiment according to FIG. 1, the control signal st for the synchronization circuit SYN1 is directly derived from the clock pulses of the accepting system clock f2 which simultaneously initiate the forwarding of an intermediately stored data word. Even if the buffer memory PUF should be full at this point in time, it will command a free memory section when the next data word is supplied by the outputting system SYST1 because of the simultaneous release of a memory section for an already forwarded data word. The outlay for buffer memory sections is lowest in this case, since the roll-in depends only on the clock pulses of the accepting system. A more or less greatly pronounced time warp between the clock pulse of the accepting system clock f2 initiating the first data word transfer and the actual appearance of said data word at the output of the buffer memory PUF will, however, arise depending on the frequency relationship of the system clocks f1 and f2 as well as depending on the required synchronization times. The storage capacity of the buffer memory, however, will be nearly fully exhuasted in the steady-state condition with continuous data flow at the output of the buffer memory PUF given a maximum data rate conditioned by the system clock f2 of the accepting system SYST2.

Figure 2:
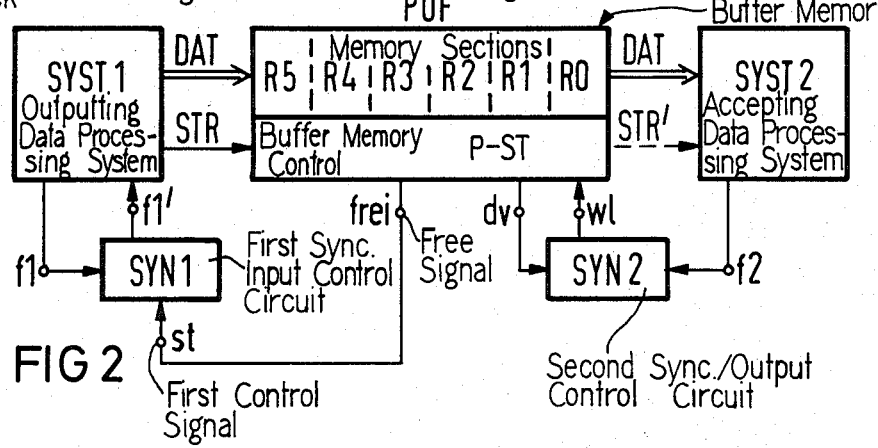
FIG. 2 is a block diagram of another embodiment according to the invention.

An alternative solution is shown in FIG. 2 wherein the control signal st for the synchronization circuit SYN1 at the input side is dependent on a signal frei indicating the availability of a prescribed plurality of free memory sections, the leading edge of said signal frei respectively appearing synchronously with the clock pulses of the clock system f2 of the accepting system SYST2 and thus likewise representing a control signal dependent on the forwarding timing pattern f2. This results in the fact that, in contrast to the sample embodiment according to FIG. 1, data words DAT are continuously input into the buffer memory PUF with successive clock pulses of the timing pattern f1 until the signal frei is omitted and that thus the buffer memory is more rapidly filled with a plurality of data words securing a continuous data flow at the output of the buffer memory. In contrast thereto, the trailing edge of the signal frei always appears synchronously with the clock pulses of the other clock system f1. As a result of the delay normally caused in the case of the two signal edges by the synchronization circuit SYN1, free memory sections are to be reserved in the buffer memory PUF since, due to the delayed activation of the inhibition, yet further data words DAT which the buffer memory PUF must accept without loss can be supplied in the meantime.

The plurality of memory sections to be reserved for this purpose depends on the determinant time conditions. Viewed in rough terms, at least two memory sections are to be held free, namely one for waiting for the lock-in into the clock system f1 and one of bridging the metastable switching status after the lock-in. Thus, the signal frei must necessarily be terminated before the occupation of these reserved memory sections and can only appear when, given n reserved memory sections, at last n+1 memory sections are free. Accordingly, at least five memory sections would have to be provided in the buffer memory PUF.

Due to the delayed activation of the reappearance of said signal, moreover, the buffer memory is temporarily emptied to a greater degree than necessary so that the filling condition constantly oscillates around the memory section determining the signal frei and thus the capacity of the buffer memory is not optimally exploited.

However, given an immediate activation of the trailing edges of the signal frei, reservation of memory sections which would normally have to be additionally provided can be eliminated—this being explained in greater detail below—so that the original minimum plurality of memory sections in the buffer memory PUF can be retained.

Figure 3:
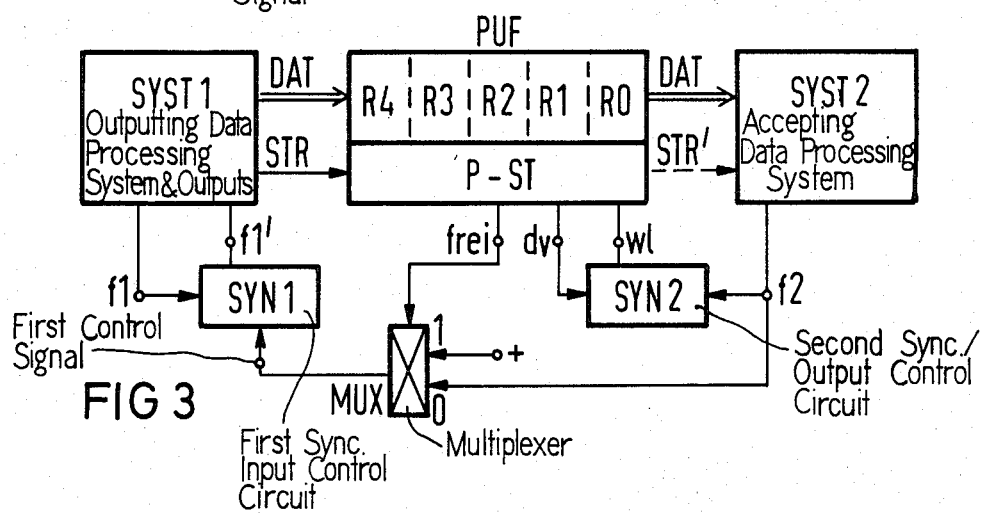
FIG. 3 is a block diagram of a third embodiment according to the invention.

A further alternative solution which consists of a combination of the two alternative solutions according to FIGS. 1 and 2 is shown in FIG. 3. The control signal ST in this case is derived both directly from the clocks of the clock system f2 as well as indirectly from the signal frei which controls a multiplexer MUX. As long as the signal frei is present, the clock pulses of the clock system f2 are inhibited, and, instead, a continuous signal + is supplied as a control signal st to the synchronization circuit SYN1 so that data words DAT are filled into the buffer memory PUF with, as in the embodiment according to FIG. 2, successive clock pulses of the clock system f1 until the disappearance of the signal frei. Subsequently, the clock pulses of the other clock system f2 control the inflow, as in the embodiment according to FIG. 1.

As to reservation of free memory locations, the sample embodiment according to FIG. 2 is analogous. However, no pendulum effect arises in this case since, after the first full occupancy of the buffer memory PUF, the clocks of the forwarding timing pattern f2 contol the in-flow synchronously with the out-flow. Also, if determination of the control signal frei was made dependent on the occupation of a single memory section in the buffer memory PUF, then the original minimum plurality of memory sections in the buffer memory could likewise be retained since, after occupation of a memory section, at least two free memory sections are also always present.

Which of the three sample embodiments explained above would be best employed in an individual case greatly depends on the marginal conditions, a few of which are to be explained in greater detail below.

Figure 4:
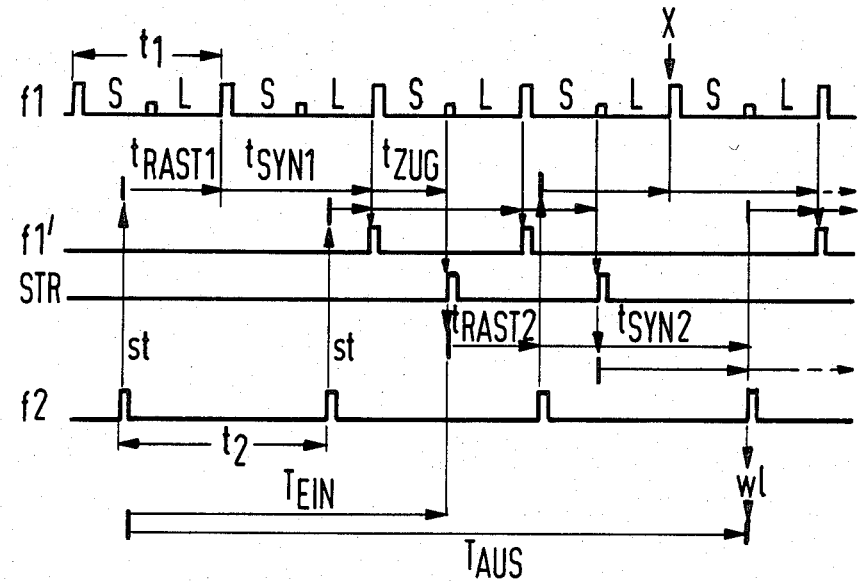
FIG. 4 is a pulse diagram for explaining the timedependency in the synchronizing by the two synchronization circuits.

On the basis of FIG. 4, let the essential time interrelationships in the synchronization of a request derived from the one timing pattern, for example f2, into the other timing pattern, for example f1, be explained first. With reference to the synchronization circuit SYN1 at the input side of the buffer memory PUF according to FIGS. 1 through 3, the four determinant pulse sequences f1, f1', STR and f2 are mutually indicated for this purpose. It is thereby assumed that two rigidly coupled cycles for the writing S and reading L of a memory system sequence during each period in the timing pattern f1 having the period duration $t_1$ and the strobe pulses STR respectively characterizing a data word DAT to be accepted by the buffer memory occur phase-shifted relative to the actual clock pulses of the timing pattern f1. In order that a request initiated by a clock pulse of the forwarding timing pattern f2 leads to the reading and transfer of a data word to the buffer memory PUF, the following times must first be marked or signified: $t_{RAST1}$ as the wating time from the request to the appearance of the next clock pulse of the corresponding system clock f1; $t_{SYN1}$ as the delay time for bridging metastable statuses; and $t_{ZUG}$ as the waiting time up to the next possible beginning of a read cycle, whereby the sum of all three subtime-sections is referenced $t_{EIN}$.

Depending on the respectively existing phase relationship between the clock pulses of the two timing patterns f1 and f2, the sub-time $t_{RAST1}$ can fluctuate in the range between 0 and $t_1$, whereas the sub-times $t_{SYN1}$ and $t_{ZUG}$, once fixed, are respectively constant.

In the present case, the sub-time $t_{SYN1}$ is selected equal to the period duration $t_1$. However, depending upon the demands, it can be greater or smaller and thereby determines the sub-time $t_{ZUG}$. The expiration of the sub-time $t_{SYN1}$ thereby respectively leads to the initiation of a clock-synchronous request pulse f1' which then results in a strobe pulse STR after the expiration of the sub-time $t_{ZUG}$ with transfer of the read data word DAT.

The occupation of a memory section in the buffer memory PUF thus always leads to a control signal dv for the other synchronization circuit SYN2 which is synchronous with the clock pulses of the outputting system f1, and which is to be synchronized into the other clock system f2. Accordingly, $t_{RAST2}$ must signify a waiting time beginning with occupation up to the appearance of a clock pulse in the clock system f2 and $t_{SYN2}$ must signify a delay time for bridging the metastable statuses until the intermediately stored data word can be finally forwarded with a signal w1 initiated upon the subsequent clock pulse of the forwarding timing pattern f2. Thus, a considerable time, namely $t_{AUS}$, passes from the request of a data word up to its actual forwarding. In this case, too, the sub-time $t_{SYN2}$ is again selected equal to the period of time $t_2$. It can likewise also be greater or smaller. Given a sub-time $t_{SYN2}$ deviating from an even-numbered multiple of the period of time $t_2$, a point in time deviating from the point in time of the clock pulses appearing in the timing pattern f2 and fixed by clock pulses of a shifted timing pattern are to be selected for the lock-in. They are selected such that the end of the sub-time $t_{SYN2}$ terminates with the respectively following clock pulse in the originating timing pattern. The phase shift of both synchronous timing patterns then corresponds to the sub-time $t_{SYN2}$ so that the forwarding of the respective data word can being in proper time with each clock pulse of the originating timing pattern. In all instances, the sub-time $t_{RAST2}$ up to the lock-in times determined by the pulses of the phase-shifted lock-in timing pattern which start the sub-time $t_{SYN2}$ can amount to between 0 and the period duration $t_2$. In an analogous manner, the overall time $t_{EIN}$ at the input side could also be shortened, particularly by means of shortening the sub-time $t_{ZUG}$. As long as the conditions allow it, however, it seems expedient to dimension the sub-times $t_{SYN1}$ and $t_{SYN2}$ equal to the period duration $t_1$ or, respectively, $t_2$ since this is less involved.

Figure 5:
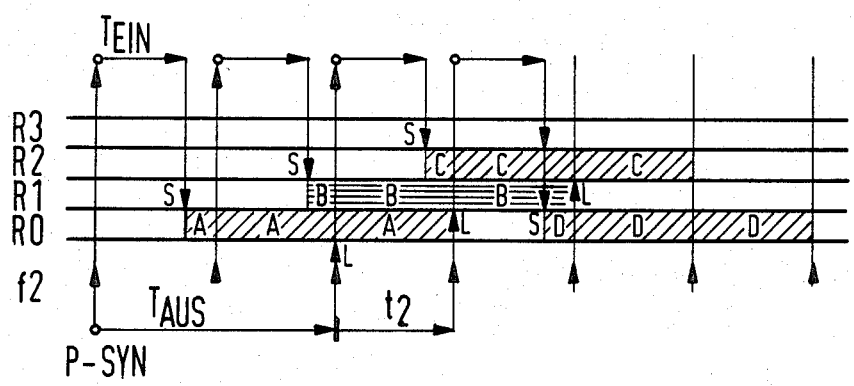
FIG. 5 is an occupancy diagram of the memory sections in the buffer memory for deriving the minimum plurality of memory sections.

FIG. 5 illustrates the effects of the overall times $T_{EIN}$ and $T_{AUS}$ on the minimum plurality of memory sections R . . . required for the buffer memory. For this purpose, four memory register R0 through R3 are illustrated into which the data words A through D are successively written with S and are released for forwarding with L for the duration of a period $t_2$. As long as $T_{SYN2}$ does not exceed the period duration $t_2$, three memory sections suffice independently of $T_{EIN}$. In order, however, to be able to intercept phase fluctuations when $T_{EIN}$ approaches a whole multiple of the period duration $t_2$, an additional memory section is required, i.e. a total of four memory sections. When on the other hand the sub-time $t_{SYN2}$ exceeds the period duration $t_2$, then the minimum plurality of memory sections should likewise be increased, namely by one memory section per extension and by respectively one period duration $t_2$.

Figure 6:
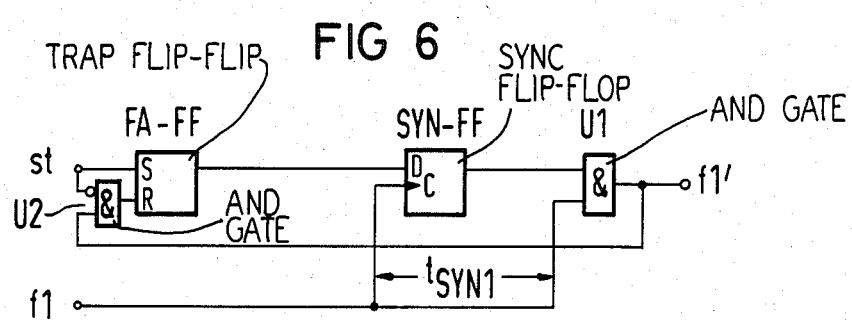
FIG. 6 is a first sample embodiment of the synchronization circuits.

The basic format of the synchronization circuits SYN1 and SYN2 is shown in FIG. 6. In a known manner, a RS flip-flop, as a trap flip-flop FA-FF, catches the signal st to be synchronized in. This is subsequently transferred with the trailing edge of the following clock pulse in the determinant clock system f1 into the synchronization flip-flop SYN-FF and thus "locking-in" is achieved. Delayed by the sub-time $t_{SYN1}$, the output signal of the synchronization flip-flop SYN-FF is then evaluated over an AND element U1 with a clock pulse. As $t_{SYN1} = t_1$, it is a further pulse of the timing pattern f1 which then supplies an output pulse f1' which simultaneously resets the trap flip-flop FA-FF over the AND element U2.

Figure 7:
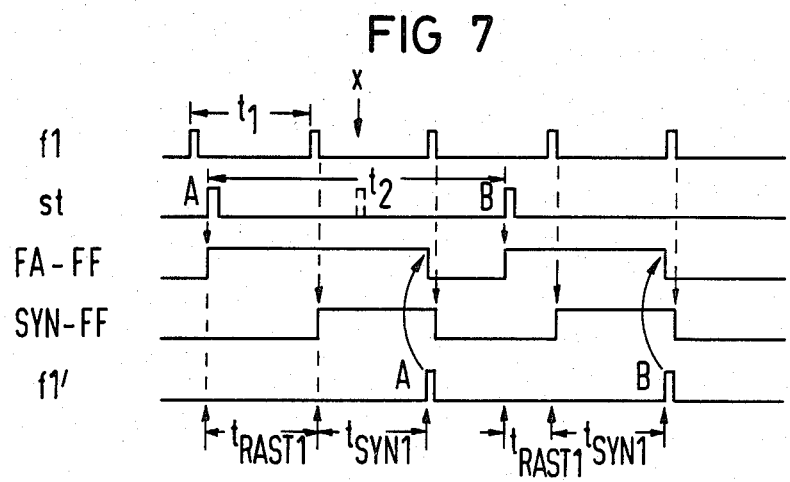
FIG. 7 is a corresponding pulse diagram according to which the pulse-shaped control signals are to be synchronized.

A corresponding pulse diagram for a control system st consisting of the individual pulses A and B is shown in FIG. 7. It becomes clear therefrom that pulses of the control signal st to be synchronized in only lead to a corresponding output pulse f1' when the spacing $t_2$ between the control pulses A and B to be synchronized in is sufficiently large so that the trap flip-flop FA-FF can be reset in time. Thus, the condition $t_2 \geq 2t_1$ must be met at $t_{SYN1} = t_1$. If, in contrast thereto, the spacing $t_2$ were halved in the selected example (this being indicated by the broken-line intermediate pulse at time point X, and thus the time condition to be observed were not met), then this request would be suppressed since the trap flip-flop FA-FF is not yet reset. Special circuits which shall be explained later are therefore required for these instances.

Figure 8:
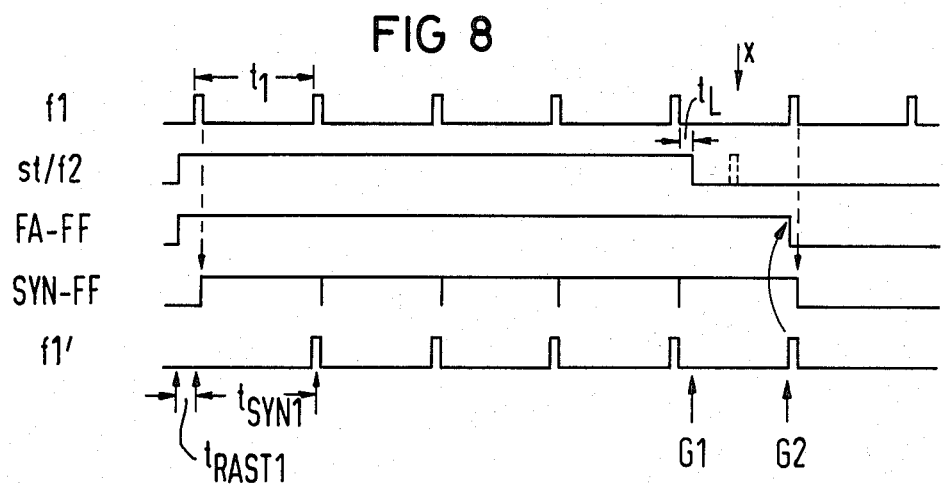
FIG. 8 is a corresponding pulse diagram according to which the control signals consisting of alternating continuous signals are to be synchronized.

The corresponding pulse diagram shown in FIG. 8 differs in comparison to that of FIG. 7 by the fact that the signal st to be synchronized in consists of control pulses having a longer duration. These represent a sequence of requests and initiate output pulses f1' synchronously with the clock pules of the determining clock system f1 for the entire effective duration, as the embodiments according to FIGS. 2 and 3 presume. In this case too, the resetting of the trap flip-flop FA-FF ensues delayed in comparison to the end of the control signal st so that, given rerouting to the clock pulses of the other clock system f2 according to the sample embodiment of FIG. 3, the next possible request pulse of the control signal st may possibly be suppressed when it appears between the two time boundaries G1 and G2, as indicated with broken lines at the time point X. Special circuit techniques are likewise to be undertaken in this case so that the synchronization circuits SYN1 and SYN2 function in faultless fashion.

Figure 9:
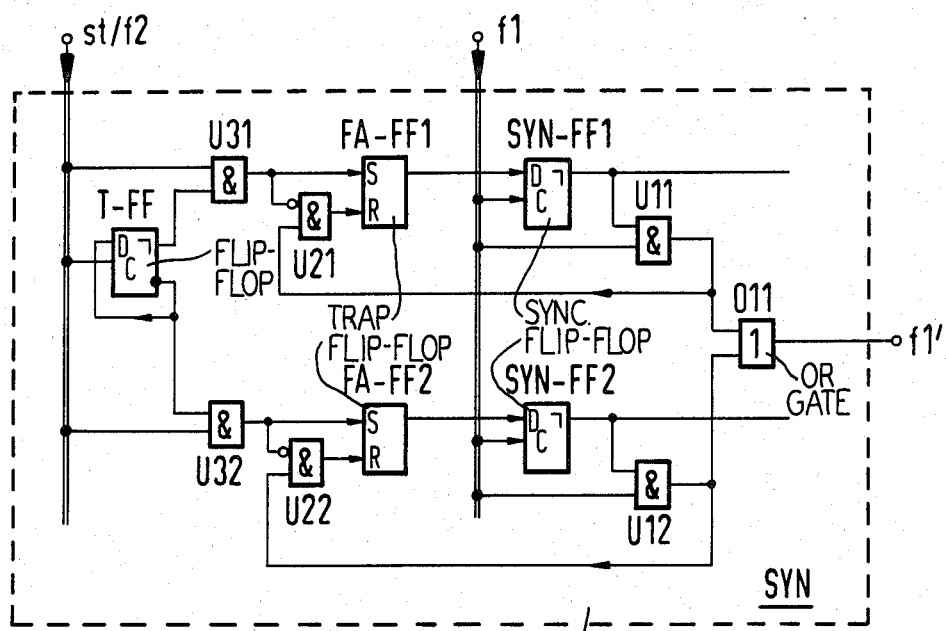
FIG. 9 illustrates a second embodiment of the synchronization circuits.

FIG. 9 shows a first embodiment of an augmented synchronization circuit which essentially differs in comparison to that of FIG. 6 since two simple synchronization arragements are provided parallel to one another and are alternately switched on with each in-coming request pulse st/f2 over a preceding divider circuit in the form, for example, of a flip-flop T-FF controlled by trailing edges. The signal outputs of both synchronizing arrangements are combined over an OR element O11.

Figure 10:
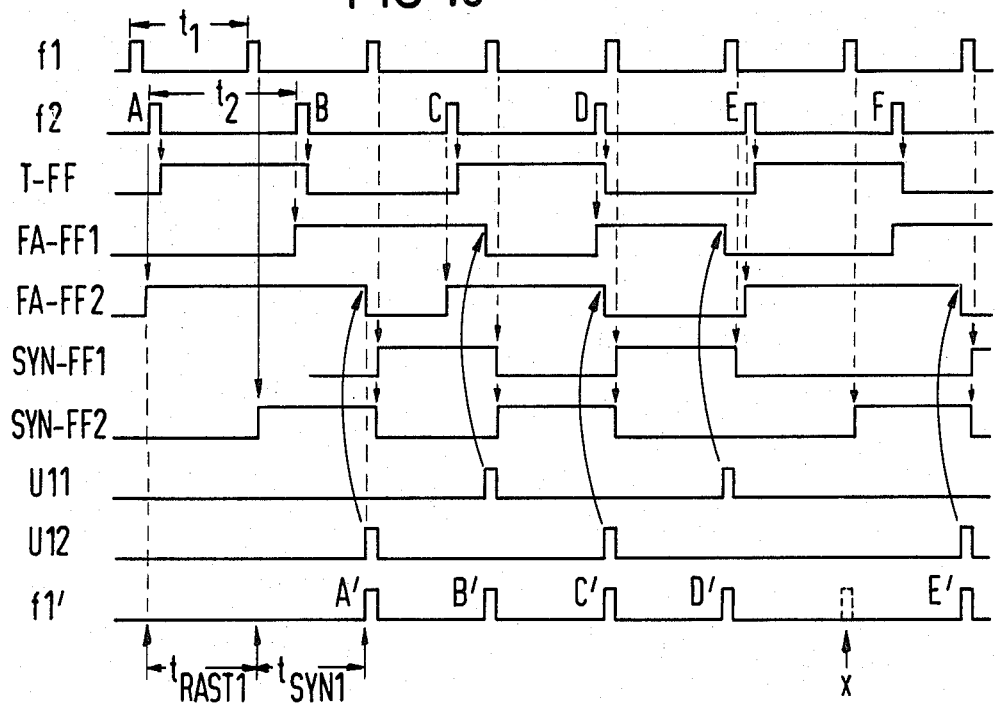
FIG. 10 is a corresponding pulse diagram.

FIG. 10 shows a corresponding pulse diagram for pulse-shaped individual requests A through F in the timing pattern f2 which are to be synchronized into the timing pattern f1. The analogous case likewise applies to requests consisting of continuous pulses according to FIG. 8. This pulse diagram further illustrates how, depending on the frequency performance and on the respective phase position of the two timing patterns f1 and f2, the in-flow into the buffer memory controlled by the control pulses f1' to be synchronized in is automatically regulated in adaptation to the possible, maximum data flow rate of the forwarding timing pattern f2. Thus, after the respective lock-in and delay, the first four successive request pulses A through D in the timing pattern f2 lead directly to successive, corresponding output pulses A' through D' in the timing pattern f1, whereas a further output pulse possible at time point X and indicated with broken lines is suppressed between the output pulses D' and E' without a request being lost.

Figure 11:
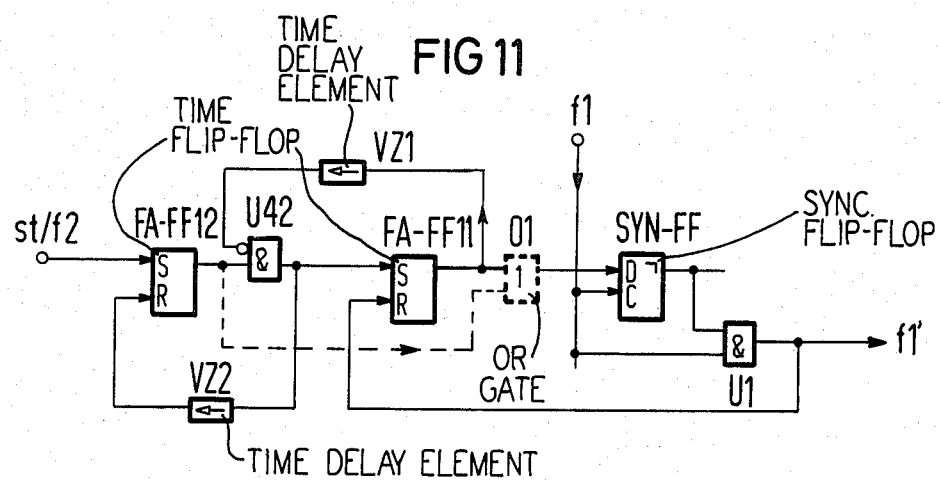
FIG. 11 is a third embodiment of the synchronization circuits.

FIG. 11 shows another alternative solution for the synchronization circuits SYN1 and SYN2 for handling requests following too quickly in succession, wherein two series-connected trap flip-flops FA-FF12 and FA-FF11 precede the synchronization flip-flop SYN-FF. Of these trap flip-flops, the first in the series is immediately reset after forwarding a request to the following flip-flop FA-FF11, and thus is available for the next request, although the preceding request may not yet have been locked in. Thus, the actual trap flip-flop FA-FF11 is not yet free again. Time-delay elements VZ1 and VZ2 for feeding the output signals of the two trap flip-flops back to their control inputs in the illustrated manner thus prevent the respective input signals from being unlatched too early and the trap flip-flops from being able to reach specific statuses.

Figure 12:
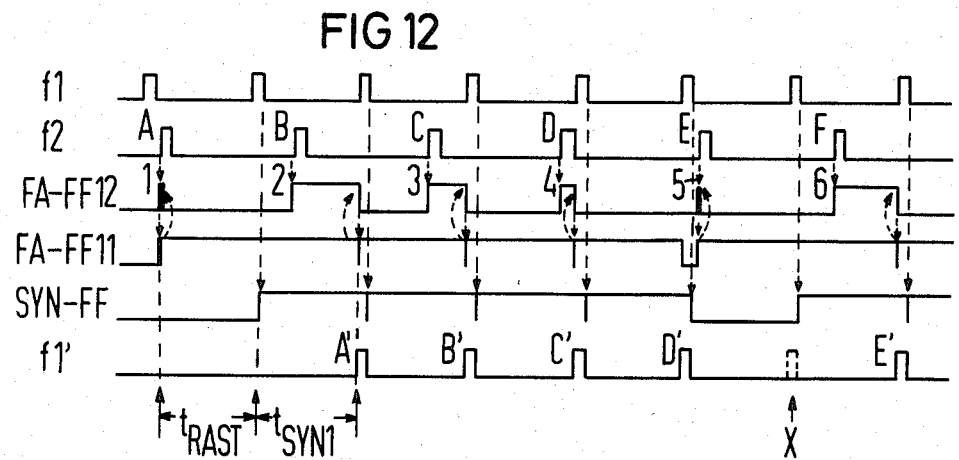
FIG. 12 is a corresponding pulse diagram.

The functioning of this arrangement, moreover, derives from the corresponding pulse diagram of FIG. 12. When the trap flip-flop FA-FF11 is free, a request, for example pulses A and E, accepted from the input flip-flop FA-FF12, are immediately forwarded into the other trap flip-flop FA-FF11, and thus the input flip-flop becomes free again with a slight delay. When, in contrast thereto, the trap flip-flop FA-FF11 is still occupied, then due to the continuing inhibition of the AND element U42 (FIG. 11), the output signal of the set input trap flip-flop FA-FF12 cannot be forwarded and the input trap flip-flop FA-FF12 remains set until transfer of the request to the following trap flip-flop FA-FF11 is possible, that is at the request pulses B through D and F in the timing pattern F2. The corresponding output pulses A' through E' of the control signal f1' again follow in clock-controlled synchronism with the clock pulses of the outputting system clock f1. Thus clock pulses of the timing pattern f1 for the control signal f1' may again be suppressed for matching to the maximum data flow rate in the timing pattern f2, as indicated at time point X by the broken-line pulse.

Let a first embodiment of a buffer memory PUF now be described on the basis of FIG. 13. This consists of four individual registers R0 through R3 into which the supplied data words DAT are transferred from a shared data bus bar with a write signal SS and from which they are retransmitted over a shared data bus bar with a read signal LS. Given execution of the registers R0 through R3 in such manner that the informational content is only changed upon inscription, the read signals LS correspond to the control signals for a selection circuit, for example a multiplexer, which connect the outputs of the respectively selected register through to the common output.

The acceptance of the data words DAT supplied by the outputting system SYST1 and their retransmission to the accepting system SYST2 is controlled by the shared buffer memory control P-ST. This acceptance depends upon the strobe signals STR co-supplied with the data and the retransmission dependent on the clock pulses of the timing pattern f2 in the accepting system SYST2. The corresponding synchronization circuit SYN2 is thus fully integrated, and the synchronization circuit SYN1 at the input side of the buffer memory PUF is only partially integrated in the control P-ST.

The structure of the control P-ST and of the synchronization circuit SYN2 is divided into identically constructed sub-circuits of which one is provided for each register R0 through R3. These sub-circuits exhibit a respective input or start flip-flop S0 through S3 which is controlled by the trailing edges and of which only one is set and which indicates the respective accepting register like an input address indicator. These flip-flops are therefore interconnected to form a type of end-around shift register which is clocked by the strobe pulses STR, whereby an indicator bit input over one of the setting inputs S circulates in ring-like fashion. An AND element US is provided for closing the ring, its three inverted signal inputs being respectively connected to one of the direct signal outputs of the first three flip-flops S0 through S2 in the ring so that forwarding to the first flip-flop S0 in the ring can only ensue when the first three flip-flops S0 through S2 are not set. One of the respective AND elements U60 through U63 is connected to the direct signal outputs of the flip-flops S0 through S3. The other signal input of the AND elements is connected to the input for the strobe pulse STR so that an in-coming strobe pulse STR becomes effective only in conjunction with one of the set flip-flops S0 through S3 over one of the AND gates, for example U60, and can thus set a logic element, for example EIN0. Such a logic element EIN0 is in the form of an RS flip-flop identifying the input of a data word DAT over the driven AND element, for example U60, and can also trigger the write signal for the selected register R0, for example.

Instead of an address indicator functioning according to the FIFO principle for the forwarding, the setting outputs of the input logic elements EIN0 through EIN03 are followed by one of the respective AND elements U70 through U73. These AND elements identify the register having the respective data word first inscribed, and thus to be forwarded first. This is carried in that each setting output of the input logic elements, for example EIN0, blocks the AND element, for example U71, allocated to the input logic element, for example EIN1, following in the ring. Of the four outputs of said AND elements U70 through U73, only one can take effect at one time and, with the control signal dv as the read address in the (1 of n) code, only one initiates the forwarding of the intermediately stored data word DAT.

For this purpose, the control signal dv is respectively supplied to one of the following synchronizing flip-flops SYN0 through SYN3 which are clocked by the clock pulses of the forwarding timing pattern f2. After the expiration of the sub-time $t_{SYN2}$, which in the present case is selected equal to the clock period $t_2$, the flip-flops set a following output logic element, for example AUS0, for the entire duration of a clock period $t_2$. Simultaneously, the corresponding input logic element, i.e. EIN0, is reset, for example over a corresponding AND element, for example U80, briefly selected by the clock pulses. The output signals of the output logic elements corresponding to the control signal w1, and as read signal LS, then effect the through-connection of the outputs of the corresponding register, for example R0, to the forwarding data bus bar.

Further allocated to each of the registers R0 through R3 of the buffer memory PUF is one of the occupancy logic elements BEL0 through BEL3, which are designed as RS flip-flops, and which are respectively set by the setting output of the corresponding input logic element, for example EIN0. Thus, they indicate the load status of the corresponding register, for example R0. They are therefore not reset until the end of the corresponding forwarding period, i.e. are reset one period $t_2$ later than the input logic elements EIN . . . . This again respectively occurs over one of the AND elements U90 through U93 in conjunction with a clock of the forwarding timing pattern f2. The resetting of the input logic elements EIN . . . , which occurs one clock period $t_2$ earlier, assures that the following control signal dv is incorporated in the timing pattern f2 at the right time in order to enable a continuous data out-flow.

Thus, the synchronization circuit SYN2 required at the output of the buffer memory PUF is completely integrated in the output control of the buffer memory. Separate trap flip-flops are not required since the preceding input logic elements EIN0 through EIN3 already fulfill their task. If sub-times $t_{SYN2}$ longer than the selected clock period $t_2$ were to be observed, then the synchronization flip-flops SYN0 through SYN3 would have to be replaced in a known manner by corresponding circuits, for example by a cascade consisting of a plurality of synchronizing flip-flops such as form, for example, the synchronizing flip-flops, for example SYN0, and the output logic elements, for example AUS0.

As already mentioned in conjunction with FIG. 2, the synchronization circuit SYN1 allocated to the input side is driven with a control signal st derived from the free status of at least one of the registers R0 through R3 in the buffer memory PUF. For this purpose, the setting output signals of the occupancy logic elements BEL0 through BEL3 are inverted and are combined over an OR element 02 to form the signal st' which, as an already acquired control signal st, influences the synchronizing flip-flop SYN-FF which is clocked with the clocks of the other timing pattern f1. Over a following AND element U5 according to FIG. 6, this signal supplies the call signal f1' synchronized into the system SYST1.

So that the storage capacity of the buffer memory limited in the present case to four memory sections thereby suffices, the undelayed activation of the trailing edge of the control signal st' is utilized, as already briefly indicated in conjunction with FIGS. 2 and 3. I.e., as soon as the buffer memory PUF is filled and the control signal st' becomes zero, the synchronizing flip-flop SYN-FF is instantaneously reset over the inverted reset input R so that two clock pulses of the timing pattern f1 are required and a request pulse f1' again appears at the output of the synchronization circuit SYN1, as shall be illustrated later on the basis of the corresponding pulse diagram.

In conjunction with a data transmission system with continuous data flow forming the accepting system SYST2, in order to maintain the data flow given an insufficient plurality of data words DAT by means of overlaying filler words, the setting output signals of the output logic elements AUS0 through AUS3 are inverted and combined over an AND element U6 which supplies a signal FW for overlaying a filler word when no data word DAT is intermediately stored and is pending for release.

Moreover, if necessary an output strobe signal STR' corresponding to the input strobe signal STR can be derived from the outputs of the AND elements U80 through U83 over an OR element. Alternatively, as indicated with broken lines, it can be derived from the outputs of the synchronizing flip-flops SYN0 through SYN3 and a following AND element U7 respectively briefly released by the clock pulses of the timing pattern f2.

Figure 14:
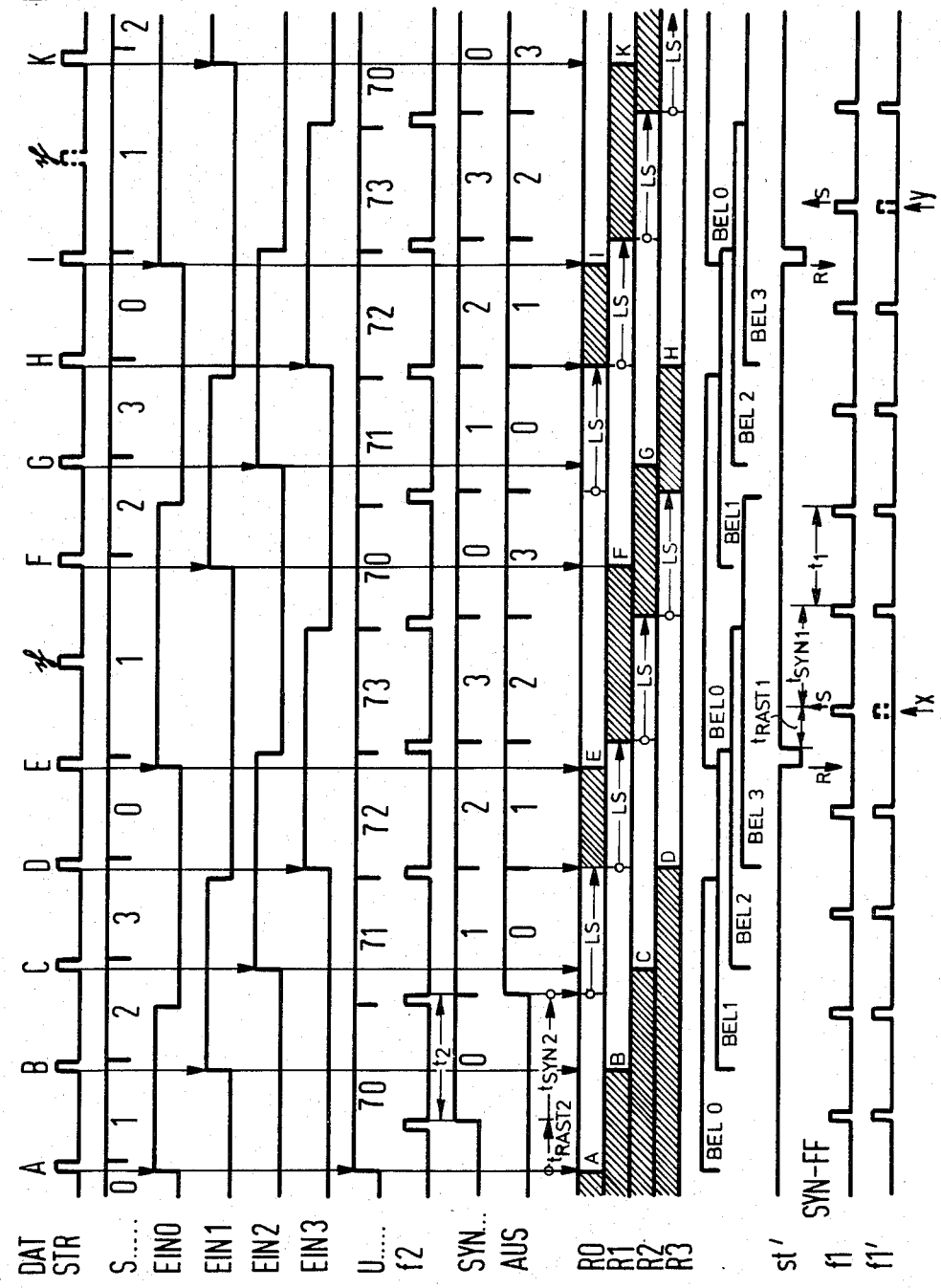
FIG. 14 is a corresponding pulse diagram.

FIG. 14 shows the corresponding pulse diagram whereby based on FIG. 4, it is again presumed that the strobe pulses STR lag behind the clock pulses in the timing pattern f1 and the request pulses f1' synchronized in by half a clock period t1. The individual start flip-flops S0 through S3 become cyclically effective with the arriving strobe pulses STR and set the input logic elements EIN0 through EIN3 respectively following them which cyclically start the synchronizing flip-flops SYN0 through SYN3 over the AND elements U70 through U73. After a delay of one clock period $t_2$, the respective output logic elements AUS0 through AUS3 are set by these synchronizing flip-flops for the duration of one clock period $t_2$ which mark the duration of the forwarding of a data word DAT with the read signals LS. The occupations of the individual registers R0 through R3 with the successive data words A through K are indicated below said pulse sequences, whereby the respective forwarding period per data word DAT is identified with LS and the time spans free of occupation are shaded.

Accordingly, each of the data words DAT is immediately transferred into one of the registers R0 through R3. The forwarding periods (LS) follow one another without interruption so that a continuous data flow is provided at the buffer output without any danger of data loss due to occurring, metastable statuses of the participating flip-flops existing due to signal clipping. At the same time, the data flow rate at the input side of the buffer memory PUF is automatically matched to the maximum data flow rate at the output side. The latter occurs within the framework of the synchronization circuit SYN1 on the basis of the inverted output signals of the occupancy logic elements BEL0 through BEL3 whose switching statuses are illustrated below the register lines R0 through R3.

As long as all occupancy logic elements BEL0 through BEL3 are not set, there is still space in the buffer for the acceptance of a data word and the control signal st' indicates the free status with the consequence that each clock pulse in the timing pattern f1 becomes a request pulse f1' after the synchronizing flip-flop SYN-FF has been set. When all registers are occupied, however, even if only briefly, for example with the transfer of the data word E, then the synchronizing flip-flop SYN-FF is instantaneously reset and the next clock pulse in the timing pattern f1 of the outputting system does not lead to a request pulse, for example at points in time X and Y, since the synchronizing flip-flop SYN-FF must still be reset. Consequently, no strobe pulse STR can follow in the respectively started clock period $t_1$. A data word gap which is respectively identified by a ψ in the uppermost line therefore arises in the data in-flow. Thus, the buffer memory can never overflow.

Figure 15:
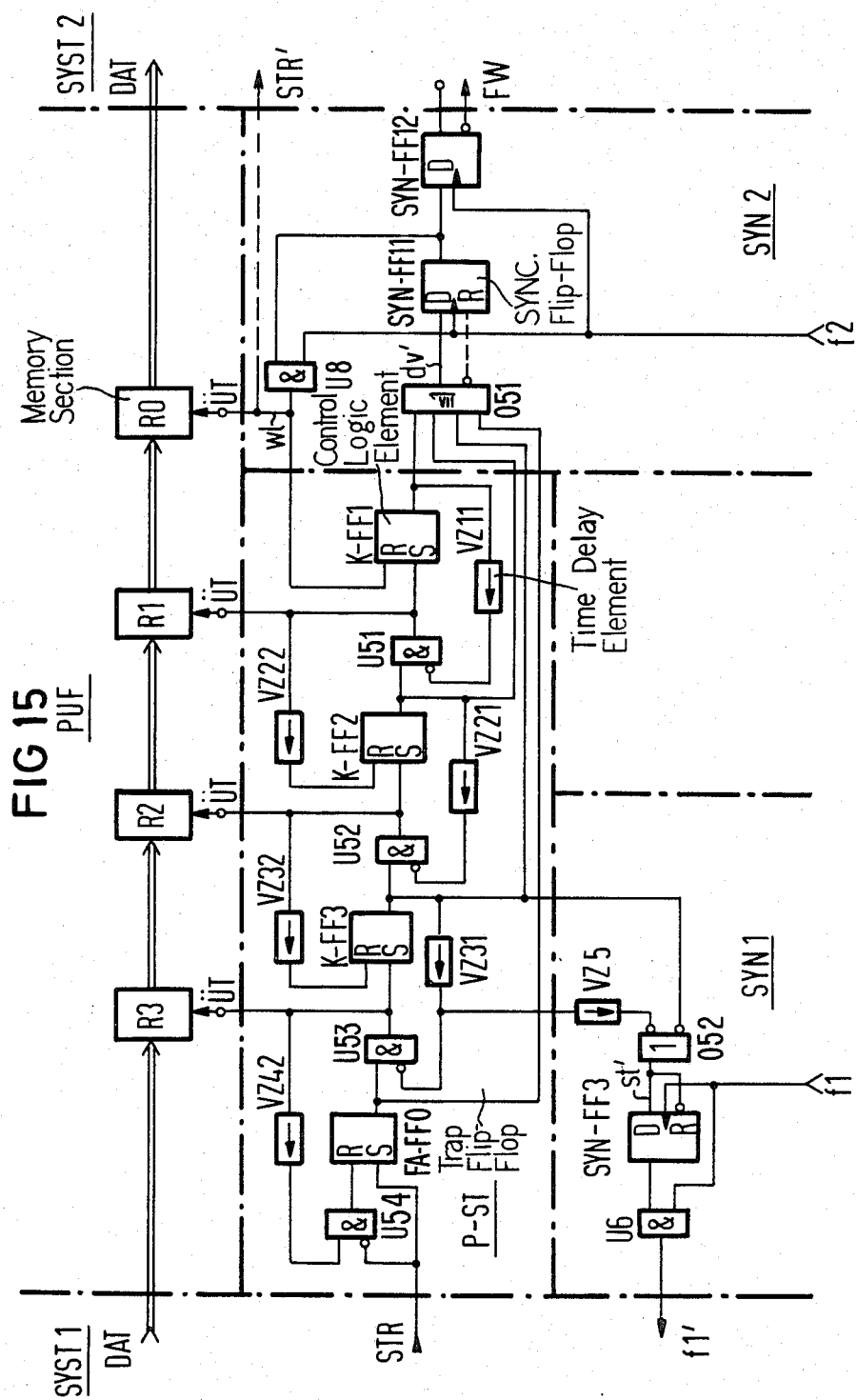
FIG. 15 is a block diagram of a further embodiment of the buffer memory.

FIG. 15 shows a further, less involved sample embodiment of a buffer memory PUF with control P-ST together with the two synchronization circuits SYN1 and SYN2. This buffer memory likewise exhibits four individual registers R0 through R3 which, departing from the previous sample embodiment, are traversed successively by the data words DAT supplied by the outputting system SYST1, namely in the reverse sequence. The first three individual registers R3 through R1 form an asynchronously functioning "tailing buffer" wherein the data words DAT are successively forwarded within a short time step-by-step to the individual register which is then free. The last individual register R0 of the series connection functions as a synchronizing or phase-in register for the accepting system SYS2 dependent on the synchronization circuit SYN2.

The acceptance and forwarding of the individual data words DAT is again carried out by the control P-ST which evaluates the respectively co-supplied strobe signal STR. A control logic element, for example in the form of a RS flip-flop K-FF1 through K-FF3, is allocated within said control P-ST to each of the asynchronously functioning registers R1 through R3, said control logic element being set when a data word is intermediately stored in the corresponding individual register. Each setting input of the control logic elements K-FF1 through K-FF3 is preceded by one of the AND elements U51 through U53 whose inverted, second signal input is respectively connected to the setting output of the corresponding control logic element over one of the delay elements VZ11 through VZ31. In addition to the setting signal for the corresponding control logic element K-FF . . . , a reset signal for the respectively preceding control logic element K-FF . . . time-delayed by means of one of the respective delay elements VZ22 through VZ32, is tapped from the output of said AND elements. The three control logic elements K-FF1 through K-FF3 thus form a series connection which is successively set by a strobe pulse STR and is respectively reset with forwarding of the data word intermediately stored in the corresponding register. The transfer clocks UT for the registers are therefore identical to the setting signals for the respectively corresponding control logic element K-ff . . . .

For security reasons, the first AND elements U53 of said series connection is preceded by a RS flip-flop as a trap flip-flop FF-FF0 which is not always required. It can be reset over a delay element YZ42 connected to the output of the AND element U53 and over an AND element U54 for the purpose of inhibiting the resetting as long as the input strobe pulse STR is still effective.

The setting outputs of all control logic elements K-FF1 through K-FF3 and of the input flip-flop FA-FF0 are combined over an OR element 051 whose output signal dv' corresponds to the control signal dv indicating the presence of intermediately stored data already acquired. The control signal dv is synchronized into the timing pattern f2 of the accepting system SYST2 by the synchronization circuit SYN2, and leads to the signal w1 as the transfer clock UT for the synchronous register R0. In the present case, the synchronization circuit consists only of the synchronizing flip-flop SYN-FF1 and of the following AND element U8 since the preceding RS flip-flops already fulfill the function of the trap flip-flop and the delay time $t_{SYN2}$ again corresponds to the clock period $t_2$. The OR element 051 thereby assures that, given even greater in-synchronization times, the forwarding of the intermediately stored data words can continuously occur in the timing pattern of the accepting clock system f2 without gaps arising in the data flow because the entire in-synchronization time in the last asynchronous register R1 of the series must be marked or identified. Connected in series with the synchronizing flip-flop SYN-FF11 is a further synchronizing flip-flop SYN-FF12 which is likewise clocked with the trailing edge of the clock pulses of the forwarding timing pattern f2 and which indicates whether a data word is proceeding for forwarding or not. In some cases, this can be employed for overlaying filler words into the data stream on the basis of the signal FW, given the absence of data words to be forwarded. Moreover, if needed an output strobe signal STR' corresponding to the input strobe signal STR can be derived from the forwarding signal w1.

Figure 13:
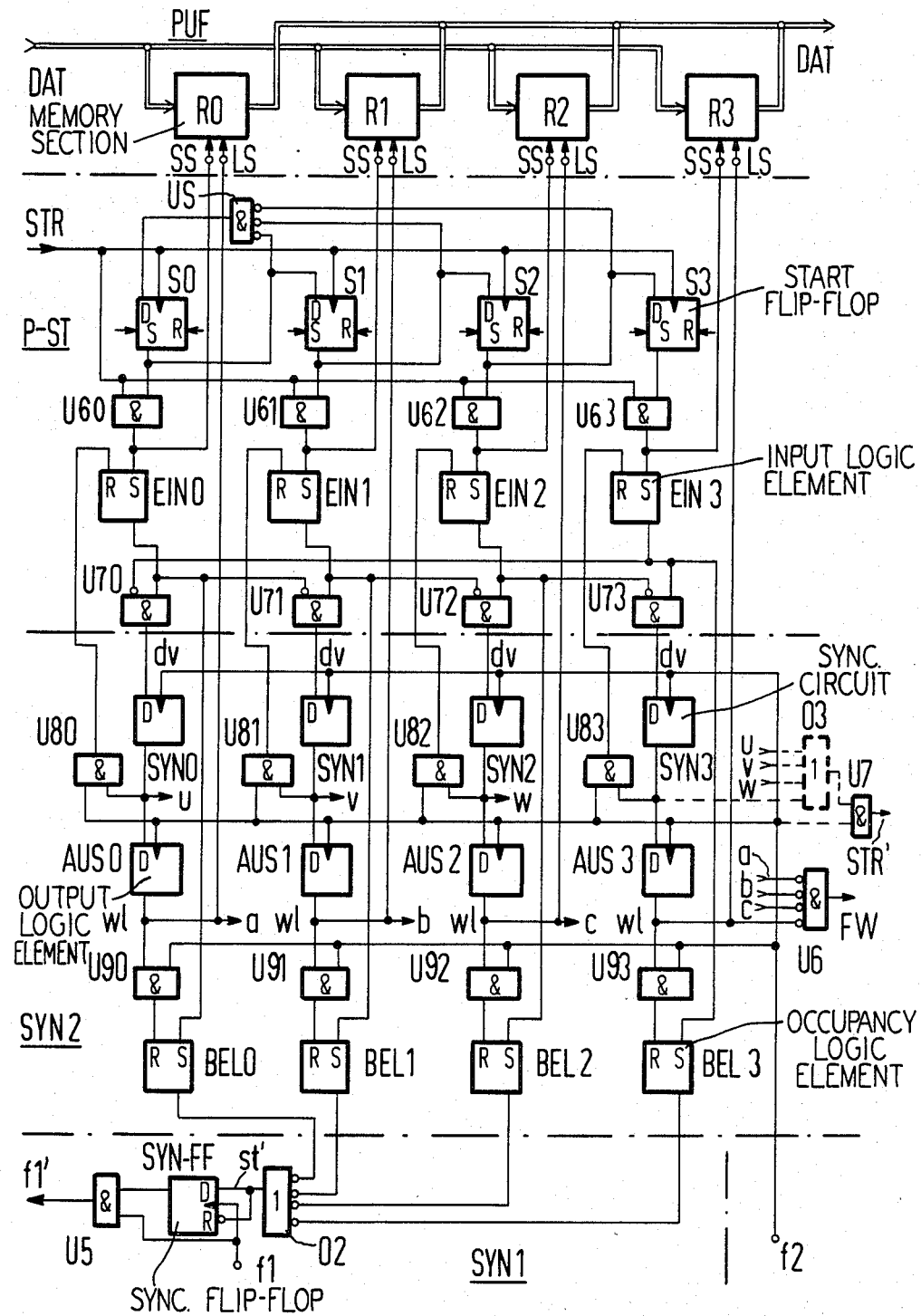
FIG. 13 illustrates the block diagram of a first embodiment of the buffer memory.

In a manner analogous to that in the preceding sample embodiment according to FIG. 13, the control signal st for the control of the synchronization circuit SYN1 at the input side of the buffer memory is derived from the occupation status of the buffer memory PUF, so that only the setting status of the first control logic element K-FF3 of the chain is determinant in the present case. Its setting output signal is inverted and controls the synchronizing flip-flop SYN-FF3 of the synchronization circuit SYN1 as an already captured control signal st'. In order to prevent a mere traversal of the corresponding register R3 from already resetting the synchronizing flip-flop SYN-FF3, the setting output signal is also delayed by the delay elements VZ31 and VZ5, and is likewise combined in inverted fashion with the undelayed setting output signal to form the control signal st' over an OR element 052. The time-delay is thereby dimensioned such that the delayed signal only takes effect when the undelayed signal has already normally decayed, and thus a brief interruption of the undelayed signal is bridged by the delayed signal for a prescribed time span. The synchronizing flip-flop SYN-FF3 is reset and thus an operation is performed on the normal data in-flow control only when, after expiration of this time span, the interruption of the undelayed signal has not yet ended.

Figure 16:
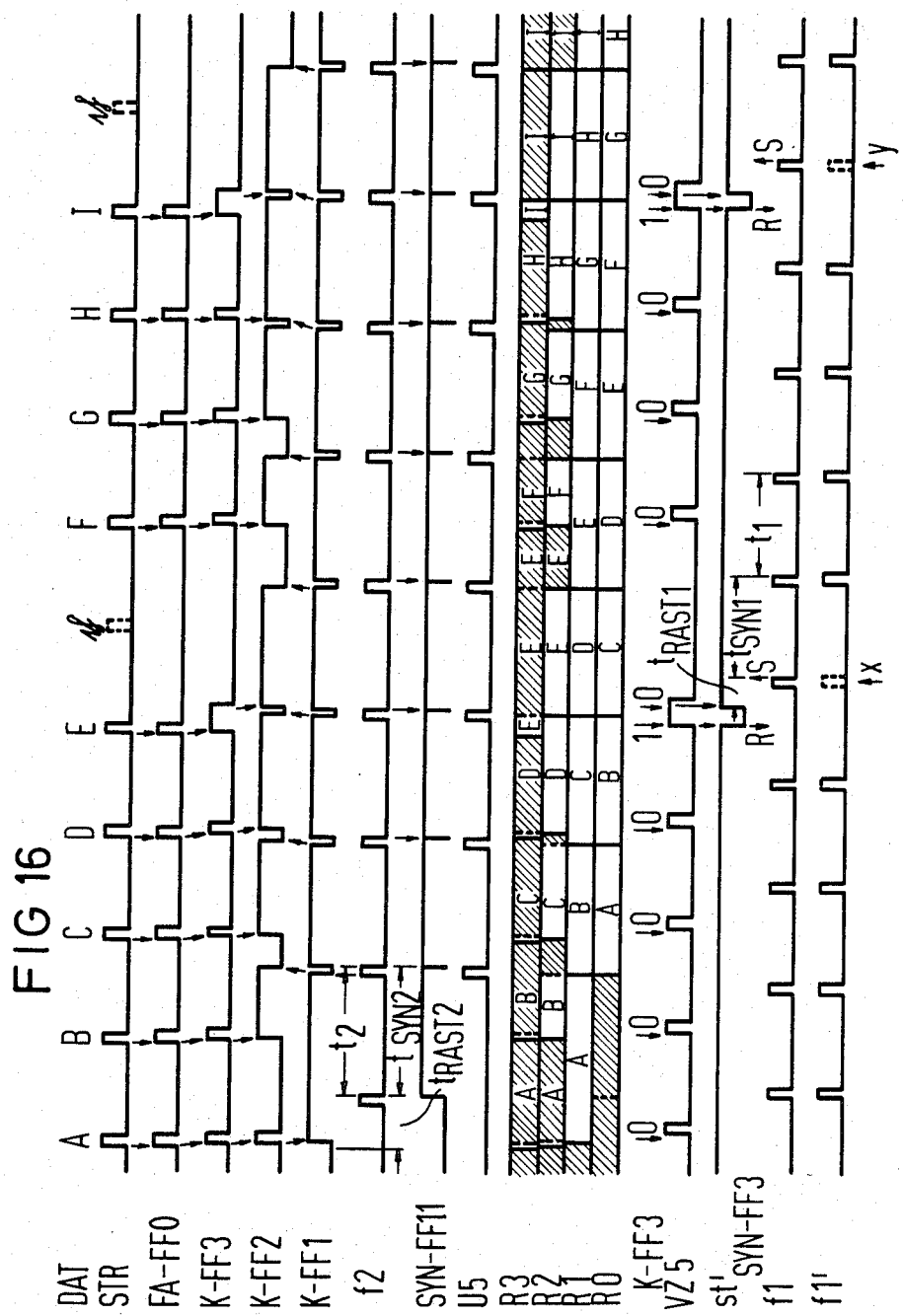
FIG. 16 is a corresponding pulse diagram.

FIG. 16 shows the corresponding pulse diagram which is constructed similar to that of FIG. 14. Arriving strobe pulses STR successively set the trap flip-flop FA-FF0 and the following control logic elements K-FF3 through K-FF1 when none of the registers R3 through R1 is occupied. Accordingly, a supplied data word DAT, for example A, is successively forwarded step-by-step over the registers R3 and R2 into register R1 where it first remains stored until, after lock-in at expiration of the sub-time $t_{SYN2}$ it is accepted into the last register R0 for forwarding. When a data word DAT is forwarded to the following register, the corresponding control logic element, for example K-FF3 and K-FF2, are again reset so that given a free following register, the control logic elements are only respectively briefly set. Given a plurality of successive data words, for example A through E, the control logic elements successively proceed into a set status lasting a longer time, with the consequence that the control logic element K-FF3 is still set after transfer of the data word E when the delayed output signal takes effect over the time-delay element VZ5. Accordingly, the control signal st' is interrupted and thus the synchronizing flip-flop SYN-F3 is reset. As in the embodiment according to FIG. 13, the result is a suppression of the possible request pulse f1' at time point X, and thus a suppression of the strobe pulse STR in the running clock cycle occurs, this again being identified by a ψ in the first line.

In comparison to the alternative solution explained with reference to FIGS. 1 through 3, the two embodiments explained on the basis of FIGS. 13 and 15 represent special cases which bear the imprint of the at least partial integration of the synchronization circuits SYN1 and SYN2 into the control P-ST of the buffer memory PUF. Accordingly, a multiplication of the synchronization arrangements according to the arrangement of FIG. 9 has at the same time been utilized in the sample embodiment according to FIG. 13 and a series connection of trap flip-flops corresponding to the arrangement of FIG. 11 has been utilized in the embodiment according to FIG. 15 in the form of the series-connected control logic elements K-FF . . . for the synchronization circuit SYN2. On the other hand, the instantaneous resetting of the synchronizing flip-flops SYN-FF in the synchronization circuit SYN1 given a filled buffer memory prevents a reservation of free registers which would otherwise be necessary as a result of the time-delay of the trailing edge of the control signal st as well. This time-delay of the trailing edge can be eliminated without hesitation since the trailing edge of the control signal st' arises synchronously with the timing pattern f1. On the other hand, the time-delay of the respectively newly in-sync leading edge of the control signal st' becomes obvious since, in the present case, up to two clock periods $t_1$ can elapse given $t_{SYN1} = t_1$ in the least favorable case before the next data word, for example F or K is supplied. This reaction time, however, is of no further consequence when sufficient data words are still intermedately stored, so that the continuous data flow at the output of the buffer memory is not jeopardized.

Figure 17:
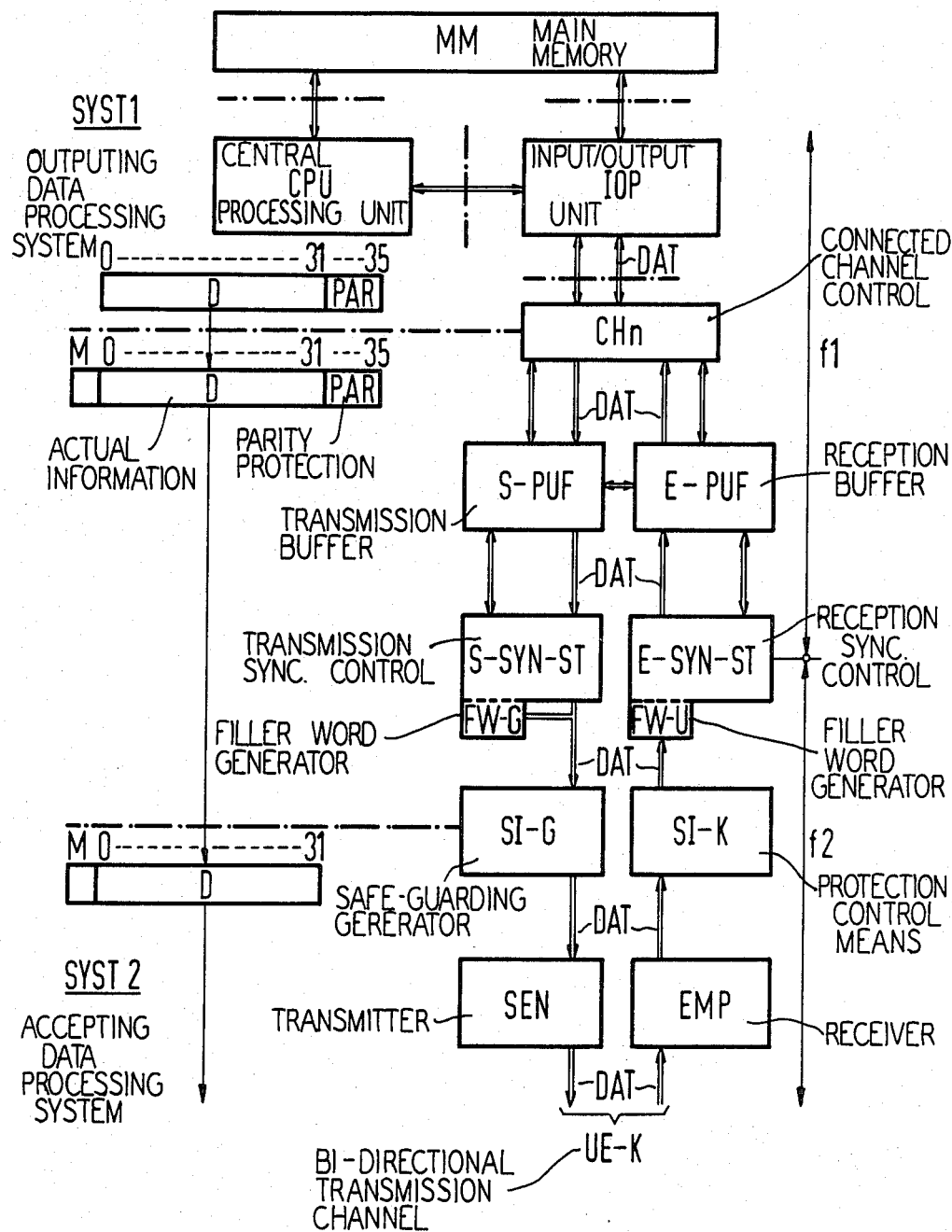
FIG. 17 is a block diagram for the coupling of two computers by means of a transmission system having an independent, divergent system clock given employment of the data transmission facility according to the invention in conjunction with a further buffer memory.

FIG. 17, based for example on U.S. Pat. No. 3,680,051, incorporated herein by reference, finally shows the block diagram of a computer forming the outputting system SYST1. It comprises a central processing unit CPU, a main memory MM, and an input-/output unit IOP which is connected over a connected channel control CHn to a transmission and reception control unit of a bidirectional transmission channel UE-K as the accepting system SYST2 having an independent clock system f2 which, for example, sets up the connection to a further computer which is not illustrated. The arrangements for the transmission and reception path described above and referenced here with S-SYN-ST and E-SYN-ST are the interface between the two different, asynchronously functioning clock systems f1 and f2. Out-going, the data words DAT supplied by the channel control CHn are first written into a transmission buffer S-PUF on the basis of the co-supplied control signals and are forwarded by the synchronization control S-SYN-ST having the filler word generator FW-G from there to a safeguarding generator SI-G. The generator SI-G executes a block protection in known fashion instead of the parity protection PAR employed within each data word DAT up to this point in the transmission path. The protected data blocks are then supplied character-wise to the transmitter SEN and, after a parallel-to-series conversion, are modulated onto an optical carrier, for example and are emitted over the transmission channel UE-K.

Conversely, characters in-coming over the transmission channel UE-K are demodulated in the receiver EMP and are supplied after serial-to-parallel conversion to the protection control means SI-K which forwards the data words with parity protection to the synchronization control E-SYN-ST over a filler word suppression means FW-U. In synchronism with the clock system f1 of the accepting computer system SYST1, the data words DAT are routed from there to a reception buffer E-PUF where the channel control CHn fetches them as needed and makes them available to the microprocessor controlled input/output unit IOP.

The formats of the data words DAT to be transmitted between the individual facilities are indicated in the left-hand part of FIG. 17. The data words are supplied, for example, with a width of 36 bits, whereby 32 bits contain the actual information D and four bits serve for the parity check protection PAR. On the basis of the control information co-supplied in parallel, these are transformed into 37 bits in the channel control CHn by means of a preceding note bit M which, if need be, indicates that the corresponding information D dare not be involved in a streaming process at the receive side, because a program interrupt of the accepting input/output unit IOP is connected therewith, for example given end of block markings, etc.

The insertion of the transmission buffer S-PUF or of the reception buffer E-PUF in the data transmission path is of particular significance since, as a link to the computer, it accommodates the different control conditions of the computer and transmission system. These conditions essentially differ from one another since the transmission channel functions continuously, whereas the computer has a plurality of jobs to carry out and therefore is only available to the transmission channel from time-to-time. Therefore, data are not only emitted or fetched individually, but rather predominantly in so-called streaming. In other words, a respectively prescribed plurality of data words DAT is continuously forwarded during successive work cycles and thus with a higher transmission rate than that of the transmission channel UE-K. On the one hand, this requires a tight coupling of the buffer memories to the input/output unit IOP over the channel control CHn in order to avoid timing problems in the in-synchronization and, on the other hand, requires sufficient memory capacity.

The shuttle buffers frequently employed for this purpose which are alternately filled and emptied, are not particularly suitable in many instances, for example, because of being linked to a prescribed block length, and because of the problems connected with the rerouting. Individual buffers exhibiting sufficient capacity and having fixed alternating write and read cycles are more advantageous. The buffer capacity can even be dimensioned lower than otherwise in conjunction with the synchronous control since roll-out can already be undertaken during the input, and the buffer memory need only compensate the difference between the source data rate and the processing data rate. Moreover, control and housekeeping information to be additionally accepted has a less disruptive effect.

Figure 18:
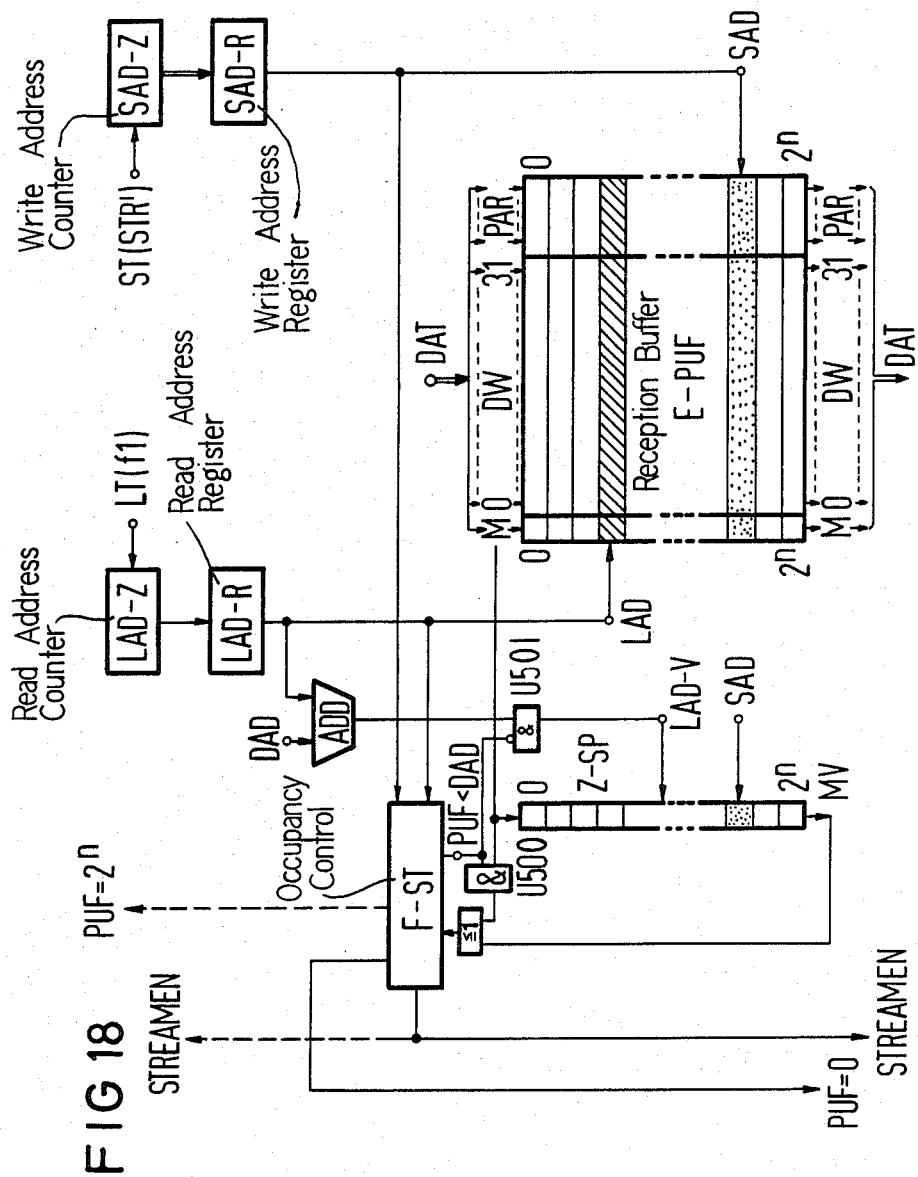
FIG. 18 is a block diagram of an additional buffer memory at the receiver side of the transmission system according to FIG. 17.

The block diagram of such a buffer memory is shown in FIG. 18, namely reception buffer E-PUF. The individual memory sections 1 through $2^n$ of the reception buffer E-PUF are driven for writing by the write address counter SAD-Z having the write address register SAD-R, and are also driven by a write clock ST formed by the strobe pulse STR'. For reading, they are driven over a read address counter LAD-Z having the read address register LAD-R and controlled by the read clock LT formed by the clock pulses of the accepting clock system f1. An occupancy control F-ST monitors the occupancy status of the buffer memory in a manner known per se on the basis of the write address SAD and of the read address LAD by means of differential formation, and derives the required control signals for the connected channel control CHn therefrom. The control signals PUF=0 correspond to SAD−LAD=0 for "buffer empty"; PUF=$2^n$ corresponds to SAD−LAD=$2^n$ for "buffer full"; and $\overline{\text{STREAMEN}}$ corresponds to SAD−LAD<DAD for "do not stream".

The stored data words DATA are monitored for existing markings by the note bit M since these dare not be involved in a streaming process. Therefore, the monitoring dare not be postponed until read, because a streaming process could already be initiated then. Rather, it must ensue earlier. Provided for that purpose is an auxiliary memory Z-ST in which the note bits M of the data words to be stored are additionally written by the respectively current write address SAD. On the other hand, they are read with a read address LAD-V leading the current read address LAD by a displacement address DAD corresponding to a streaming unit. This read address LAD-V is formed by an adder ADD from the read address contained in the read address register LAD-R and from the displacement address DAD. The note bit MV thus read to be leading then always appears during read at the right time such that a now running streaming process can still be concluded before the marking M appears at the output of the reception buffer E-PUF.

A counting operation is initiated in the occupancy control F-ST with every note bit MV read leading. This counting operation encompasses a plurality of read operations of the reception buffer E-PUF corresponding to the DAD. Only when this counting operation has been concluded, is the streaming prohibition signal $\overline{\text{STREAMEN}}$ retracted. Since a plurality of note bits can occur within a possible streaming section, the counting operation is started anew at every note bit MV read leading.

The counting operation can be controlled in a manner known per se by a correspondingly preset counter which is preset with each note bit MV read leading, and which is set back by one step with each read operation of the reception buffer E-PUF. The streaming prohibition signal $\overline{\text{STREAMEN}}$ appears as long as the counter is not situated in its zero position.

Since no streaming process can sequence given a buffer occupancy SAD−LAD>DAD corresponding to PUF>DAD and since pre-reading can lead to errors even given disruption-free reading, a note bit M in this instance leads directly via the AND element U500 to the initiating of the counting operation. The leading reading of the auxiliary memory Z-SP is inhibited over the AND element U501.

The control signals PUF=0 and STREAMEN are principally of significance for the following reception side of the channel control CHn, so that data words DAT can, given PUF=0, be picked in the step-by-step method with $\overline{\text{STREAMEN}}$, or, given PUF=0, can be picked with STREAMEN in the streaming process.

Given employment of the buffer as a transmission buffer S-PUF, the control signals PUF=$2^n$ and STREAMEN directed opposite the data flow (and shown in broken lines) are of principal significance for the transmission side of the channel control CHn to indicate that, given an overflowing buffer, further transmission may temporarily not occur, and to indicate whether transmission may be carried out in the streaming process. In this case, the signal $\overline{\text{STREAMEN}}$ is triggered when memory area just precisely sufficing for a streaming packet is still free, i.e. SAD−LAD=DAD. Accordingly, data words may be supplied with STREAMEN in the streaming process given PUF=$2^n$, data words may only be supplied in the individual step method given PUF=$2^n$ with $\overline{\text{STREAMEN}}$, and given PUF=$2^n$, no further data word may be supplied.

In this case, the write clock ST is formed by the supplied strobe signal STR, and the read clock LT is formed by the clock pulses of the timing pattern f2 of the transmission system. The auxiliary memory Z-SP, including the corresponding control for the leading reading of the note bit M shown in FIG. 18 can also be omitted.

Thus, the transmission facility according to the invention can be very effectively incorporated into the coupling of two computers.

Although various minor changes and modifications might be proposed by those skilled in the art, it will be understood that I wish to include within the claims of the patent warranted hereon all such changes and modifications as reasonably come within my contribution to the art.

I claim as my invention:

1. A data transmission facility connected by data and control lines between asynchronously controlled data accepting and data outputting processing systems for the transfer of data words from a data output of the outputting system to the transmission facility and from the facility to a data input of the accepting system, each system having an associated system clock producing clock pulses of a given timing pattern, comprising:

a buffer memory means having at least three memory section means for intermediate storage of a respective data word from the outputting system;

first and second synchronization circuit means, the first circuit means comprising an input control for the buffer memory means which is synchronous with the data outputting system clock and is connected to the data output of the outputting system for controlling transfer of a data word into the memory section means of the buffer memory means available for the transfer, and the second circuit means comprising an output control synchronous with the system clock of the data accepting system and connected to the buffer memory means for controlling forwarding of a respective data word from a memory section means of the buffer memory means available for output to the data input of the data accepting system;

after storage of a data word in the buffer memory means, said buffer memory means creating a corresponding second control signal which is synchronized via the second synchronization circuit means into a timing pattern of the system clock of the accepting system while avoiding logically undefined intermediate statuses in the respective data and control line, said second synchronization circuit means creating a second synchronization control signal which initiates the forwarding of a stored data word to the data accepting system;

means for generating a first control signal dependent on the given timing pattern of the system clock of the accepting system;

the first synchronization circuit means receiving the first control signal; and the first synchronization circuit means synchronizing said first control signal into the timing pattern of the outputting system clock while avoiding logically undefined intermediate statuses in the respective data and control lines and creating a first synchronization control signal for initiating output and transfer of a data word together with a strobe signal from the data output of the data outputting system, said strobe signal initiating intermediate storage of said data word.

2. A data transmission facility according to claim 1 wherein means are provided for generating the first control signal for the first synchronization circuit means in conjunction with each clock pulse of the timing pattern of the accepting system clock.

3. A data transmission facility according to claim 2 wherein said means for generating provides that the first control signal leads the respective clock pulse of the accepting system clock forwarding timing pattern by a respective delay time created by the second synchronization circuit means allocated to the accepting system side.

4. A data transmission facility according to claim 3 wherein said delay time corresponds to a whole multiple of a clock period time of the accepting system clock forwarding timing pattern; and given said delay time being greater than the clock period time, the number of memory section means in the buffer memory means is correspondingly increased in order to enable a continuous data flow at the output side.

5. A data transmission facility according to claim 1 wherein the buffer memory means outputs a free signal indicative of a presence of at least one free memory section means therein, and means are provided for deriving the first control signal for the first synchronization circuit means allocated to the outputting system from the free signal output by the buffer memory means and a control signal synchronized-in releases clock pulses of the outputting system clock timing pattern occurring during its effective duration as request signals for successive transfer of data words.

6. A data transmission facility according to claim 5 wherein both a leading edge as well as a trailing edge of the free signal is delayed by the first synchronization circuit means; the minimum number of memory section means of the buffer memory means is increased by n individual registers in accordance with the clock pulses of the outputting system clock timing pattern still taking effect during a delayed decay time; and said free signal is only generated when at least (n+1) individual registers of the buffer memory means are still free.

7. A data transmission facility according to claim 5 wherein the first synchronization circuit means delays only a leading edge of the free signal and a trailing edge of the free signal becomes instantaneously effective and suppresses following clock pulses of the outputting system clock timing pattern as request signals.

8. A data transmission facility according to claim 5 wherein directly upon disappearance of the free signal means are provided for rerouting the first synchronization circuit means to the first control signal emitted in conjunction with each clock pulse of the accepting system clock forwarding time pattern.

9. A data transmission facility according to claim 2 wherein means are provided for releasing the second synchronization circuit means only when three memory sections in the buffer memory means required for a continuous data flow at the processing acceptance system side are occupied with data words.

10. A data transmission facility according to claim 1 wherein at least one of the first and second synchronization circuit means comprise at least one trap flip-flop and at least one synchronizing flip-flop, the trap flip-flop being connected to receive one of the first and second control signals to be synchronized in and the following synchronizing flip-flop is connected to accept an output signal of the trap flip-flop with the respective system clock and an AND gate connected to receive an output of the synchronization flip-flop and the respective system clock.

11. A data transmission facility according to claim 10 including at least two synchronization unit means comprising a trap flip-flop and a synchronizing flip-flop with AND gates for avoiding request suppressions given requests following too quickly in succession, said synchronization unit means being cyclically switched on in succession over a preceding control logic element with each arriving control signal to be synchronized in.

12. A data transmission facility according to claim 10 wherein in order to avoid request suppression given requests following too quickly in succession at least two trap flip-flops connected in series over a respective AND gate are provided, a second signal input of the AND gate being inhibited via a time-delay element connected from an output of the following trap flip-flop, and the preceding trap flip-flop being resettable via a time-delay element connected at an output of the AND gate between the flip-flops.

13. A data transmission facility according to claim 10 wherein the trap flip-flop of the synchronization circuit means is at least partially an integral component of a control of the buffer memory means.

14. A data transmission facility according to claim 1 wherein the memory section means of the buffer memory means form a series circuit which is successively traversed step-by-step by the data word of the outputting system, the data word intermediately stored in a last of the memory section means being forwarded to the accepting system synchronously with the accepting system clock; except for said last memory section means at an output end of the buffer memory means each individual memory section means having a control logic element means allocated to it for indicating occupancy status of the corresponding memory section means; via preceding AND elements means for inhibiting setting inputs of the control logic element means, said control logic element means being formed in a series circuit, and a setting output of each control logic element means being connected to an inverted, second signal input of the corresponding AND element means; transfer clock means for roll-in of a data word into the respective memory section means and reset signals for the respective preceding control logic element means being derived from the respective following AND element means of the series circuit so that dependent on an incoming strobe signal, the data words are successively forwarded step-by-step from individual register to individual register directly to a free individual memory section means lying closest to the output end of the buffer memory means; and a synchronizing flip-flop and a following AND element being provided for the memory section means forming the output end of the buffer memory means.

15. A data transmission facility according to claim 14 wherein the synchronizing flip-flop of the output end memory section means being preceded by an OR element, outputs of all preceding control logic element means and of an input trap flip-flop being connected to a respective signal input of the OR element.

16. A data transmission facility according to claim 1 wherein the individual memory section means of the buffer memory means can be selectively driven for writing and for reading data words; each individual memory section means having a flip-flop controlled by a trailing edge of the strobe signal and having a following AND element, all flip-flops forming an end-around shift register means for identifying a respective accepting individual memory section means and depending on a setting status of the flip-flops and on a presence of the strobe signal, write signals being derived from an output of one of said AND elements; said AND elements being followed by a respective RS flip-flop as an input trap flip-flop means for identifying existing read requests for the buffer memory means; and over a serially functioning output network outputs of the input trap flip-flops being connected to activate synchronization circuits individually allocated in a sequence of their activation, said synchronization circuits after expiration of a required in-synchronization time dependent on the accepting system clock supplying a read signal for corresponding memory section means and a reset signal for the respective preceding trap flip-flop so that the read signal is maintained for a duration of an entire clock period of the accepting system clock.

17. A data transmission facility according to claim 16 wherein an additional bi-stable logic element means for identifying occupation status of the individual memory section means is provided per individual memory section means, said additional bi-stable logic element means being set with a response of a corresponding input trap flip-flop; and said first control signal identifying a free status of at least one individual memory section means in the buffer memory means being derived over an OR element from signal outputs of the logic elements indicating the occupation status.

18. A data transmission facility according to claim 14 wherein for maintaining a continuous data flow at an output of the buffer memory means given an absence of data words, means are provided for overlaying filler words instead of the data words into a data stream for the accepting system; and a control signal for the overlay of the filler words is directly derived from an inverted signal of at least one of the logic elements initiating a transmission period for the data words.

19. A data transmission facility according to claim 1 wherein the data outputting system comprises a computer and the buffer memory means for in-synchronization is in series connection with a preceding elastic buffer memory means with mutually independent input and output control whose output control is dependent on a control of the buffer memory means for the in-synchronization.

20. A data transmission facility according to claim 19 wherein the two data processing systems comprise an outputting computer means and an accepting computer means which are coupled by means of an intervening transmission system having transmission and reception means connected by a transmission channel; the transmission system having a system clock; the series connection of the elastic buffer memory means and buffer memory means for the in-synchronization onto the transmission system clock in front of the transmission means at the transmission side corresponds on the reception side to a mirror-inverted arrangement of the series connection of buffer memory means for the in-synchronization onto the system clock of the connected computer means and elastic buffer memory means following the reception means; means being provided such that every clock pulse of the transmission timing pattern not coinciding with a filler word simultaneously effects as a strobe signal direct acceptance of in-coming data words into the buffer memory means for the in-synchronization; and in combination with the synchronization circuit means allocated to the output side of said buffer memory means, means being provided for generating a control signal synchronous in clock with the accepting system clock, said control signal forcing transfer of the data word pending for forwarding in the respective initiated clock cycle.

21. A data transmission facility according to claim 20 wherein means are provided such that the data supplied by the data outputting computer means which effects a program interrupt at the accepting computer means are identified by an additional note bit within the respective data word to be transmitted, and data words identified in this manner are individually forwarded; for preventing a packet-wise forwarding of data words stored in the elastic buffer memory means at the reception side to the accepting computer means when one of the data words within such a packet is marked by an additional note bit, means are provided for depositing an auxiliary identifier upon inscription of the data words identified into the elastic buffer memory means and storing it in an auxiliary memory means of the elastic buffer memory means under a same write address; said auxiliary memory means being driven with an address for reading upon every read operation for the elastic buffer memory means, said address being increased in comparison to the current read address for the elastic buffer memory means by a displacement address identifying a packet length when at least one packet is stored; and when less than one packet is stored means are provided for initiating a counting operation with a plurality of counting steps corresponding to the displacement address; and an inhibit signal for preventing packet-wise call-in of the data words stored in the elastic buffer memory means being generated by the accepting computer means during each running counting operation.

* * * * *